United States Patent
Mack et al.

(10) Patent No.: US 6,701,742 B2
(45) Date of Patent: Mar. 9, 2004

(54) HEAT EXCHANGER, SUCH AS EVAPORATOR, CONDENSER, OR THE LIKE

(75) Inventors: Hans-Christian Mack, Sontheim/Bergenweiler (DE); Walter Lipp, Haunsheim (DE); Michael Neumann, Giengen/Binz (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 78 days.

(21) Appl. No.: 10/117,805

(22) Filed: Apr. 8, 2002

(65) Prior Publication Data

US 2002/0129617 A1 Sep. 19, 2002

Related U.S. Application Data

(63) Continuation of application No. PCT/EP00/09734, filed on Oct. 5, 2000.

(30) Foreign Application Priority Data

Oct. 8, 1999 (DE) .......................... 199 48 480

(51) Int. Cl.[7] .............................. F25D 11/00
(52) U.S. Cl. .................. 62/430; 62/371; 62/426; 62/432
(58) Field of Search .................. 62/430, 432, 440, 62/444, 371, 452, 457.2, 457.9, 426, 530, 515

(56) References Cited

U.S. PATENT DOCUMENTS

| | | | |
|---|---|---|---|
| 1,739,625 A | * 12/1929 | Wolters ................. | 62/457 |
| 2,191,198 A | 2/1940 | Gould | |
| 3,066,847 A | * 12/1962 | Fortune .................. | 229/68 |
| 3,736,769 A | * 5/1973 | Petersen ................. | 62/530 |
| 4,459,826 A | 7/1984 | Hirano et al. | |
| 4,827,735 A | * 5/1989 | Foley ..................... | 62/430 |
| 4,931,333 A | 6/1990 | Henry | |
| 5,239,839 A | * 8/1993 | James .................... | 62/434 |
| 5,824,682 A | 10/1998 | Van Lommen et al. | |
| 6,083,256 A | * 7/2000 | Der Ovanesian ....... | 607/114 |
| 6,100,268 A | 8/2000 | Van Lommen et al. | |

FOREIGN PATENT DOCUMENTS

| | | |
|---|---|---|
| DE | 926 553 | 4/1955 |
| DE | 2 131 430 | 1/1972 |
| DE | 36 05 891 A1 | 8/1987 |
| DE | 40 36 392 A1 | 5/1992 |
| DE | 296 05 781 U1 | 9/1997 |
| EP | 0 109 043 A1 | 5/1984 |
| EP | 0 843 138 A1 | 5/1998 |
| EP | 0 974 794 A2 | 1/2000 |
| EP | 1 006 324 A1 | 6/2000 |
| WO | WO 86/00219 | 1/1986 |
| WO | WO 95/05383 | 2/1995 |

* cited by examiner

Primary Examiner—Melvin Jones
(74) Attorney, Agent, or Firm—Laurence A. Greenberg; Werner H. Stemer; Gregory L. Maybeck

(57) ABSTRACT

A heat exchanger, such as an evaporator, a condenser, or the like, for a refrigerator, such as a chill cabinet, a freezer cabinet or the like, includes at least one surface with which a thermal energy storage medium is in at least as far as possible heat-conducting contact, and bag-like reception containers to be connected to the evaporator.

23 Claims, 2 Drawing Sheets

HEAT EXCHANGER, SUCH AS EVAPORATOR, CONDENSER, OR THE LIKE

CROSS-REFERENCE TO RELATED APPLICATION:

This application is a continuation of copending International Application No. PCT/EP00/09734, filed Oct. 5, 2000, which designated the United States.

BACKGROUND OF THE INVENTION

1. Field of the Invention

The invention relates to a heat exchanger, such as an evaporator, a condenser, or the like, for a refrigerator, such as a chill cabinet, a freezer cabinet, or the like, with at least one surface provided on the heat exchanger and with which a thermal energy storage medium is in at least as far as possible heat-conducting contact.

European Patent Application 0 843 138 A1 and European Patent Application 0 714 396 A1, corresponding to U.S. Pat. No. 6,100,268 to Van Lommen et al. and to U.S. Pat. No. 5,824,682 to Van Lommen et al., each disclose a plate-like heat exchanger that in each case has a reception space for receiving a thermal energy storage medium or what is referred to as a eutectic. The reception space is, in both instances, formed by a trough-like plate wall that is secured to the plate-like heat exchanger and the free edges of which are secured to the heat exchanger in a liquid-tight manner and by the trough curvature of which the reception space for the thermal energy storage medium is formed. Although such heat exchangers bring about an improvement in the energy consumption values in refrigerators, such as, for example, chill cabinets, the construction of the heat exchanger, with its reception space for the eutectic, is, nevertheless, extremely inflexible because, if it is necessary, as required, to change the receiving capacity of the reception container and, consequently, the filling mass of the thermal energy storage medium, such a configuration necessarily requires, for the heat exchangers configured differently according to demand, a corresponding multiplicity of plate walls having differently curved shapes and influencing the receiving volume. Such a requirement contributes to the considerable increase in cost of the heat exchangers not only on account of the markedly higher logistics requirements, but also because of the different tools necessary due to the different configuration of the curved wall plates. Moreover, the configuration, existing in the prior art, of the reception space for the eutectic entails the risk of potential leakages due to the relatively complex construction of the heat exchanger plates. Furthermore, the principle, existing in the prior art, for providing a reception space for a thermal energy storage medium means a complete departure from conventional heat exchanger plates, in particular, evaporator plates, when the aim is to improve the energy efficiency of refrigerators.

SUMMARY OF THE INVENTION

It is accordingly an object of the invention to provide a heat exchanger, such as evaporator, condenser, or the like that overcomes the hereinafore-mentioned disadvantages of the heretofore-known devices of this general type and that, by simple structure measures, avoids the disadvantages occurring in the prior art.

With the foregoing and other objects in view, there is provided, in accordance with the invention, a heat exchanger for a refrigerator including at least one separate reception container receiving a thermal energy storage medium and having at least one flexurally slack container wall bearing at least approximately in heat-conducting contact against the thermal energy storage medium dependent upon the flexurally slack properties of the container wall. The heat exchanger can be an evaporator or a condenser, and the refrigerator can be a chill cabinet or a freezer cabinet.

In accordance with another feature of the invention, there is provided a separate reception container that serves for receiving the thermal energy storage medium and that has at least one approximately flexurally slack container wall that, by virtue of its flexurally slack properties, can come to bear at least approximately in heat-conducting contact against the heat exchanger.

By providing at least one separate container uncouplable from the heat exchanger for receiving the thermal energy storage medium, conventional heat exchanger configurations can be combined with the reception container and, therefore, with the thermal energy storage medium to give a marked refrigerator energy saving that may be, for example, in the range of between 5 and 15%. Due to the combination possibility and to the use of conventional heat exchangers that is afforded thereby, there is no need, with a view to the use of thermal energy storage media, to have a new heat exchanger configuration, as a result of which not only is cost-intensive development and construction work avoided, but at the same time the costs incurred in producing the new heat exchanger configurations no longer arise. By providing a separate reception container, the container can be adapted particularly specifically and, therefore, with high efficiency in terms of its size, its filling with a thermal energy storage medium and its degree of filling to a predetermined application, for example, for an evaporator of a chill cabinet or an evaporator of a freezer cabinet. Furthermore, the separate reception container makes it possible to have a manufacturing sequence that is entirely independent of the heat exchanger manufacture and is, therefore, extremely flexible, such as, for example, in terms of the material used for producing it, its size and geometry and also its filling with the thermal energy storage medium.

In accordance with a further feature of the invention, the reception container is formed at least as far as possible from flexurally slack material.

What is to be meant in this connection by flexurally slack material is a material that is resilient and can be adapted at least as far as possible to differently configured surface contours. Adaptation is, at the same time, to be capable of taking place with relatively little effort. For example, film-like thin-walled materials are to be included here.

By the provision of the reception container being of material that is flexurally slack on all sides, in series manufacture it can be brought, barrier-free and, therefore, in a particularly simple way, especially efficiently into heat-conducting contact with the heat exchanger, for example, in the form of an evaporator plate or of a wire-tube evaporator. Moreover, reception containers formed from flexurally slack material can be inserted quickly and without much force into the interspace produced by the wire bars in wire-tube evaporators.

In accordance with an added feature of the invention, there is provided an evaporator plate having heat exchange surfaces, one of the heat exchange surfaces being substantially disposed in heat-conducting contact with the flexurally slack container wall of the reception container and being approximately liquid-tightly coupled to the one heat exchange surface.

In accordance with an additional feature of the invention, the reception container has a size adapted substantially to dimensions of the evaporator plate at least on the flexurally slack container wall in heat-conducting contact with the evaporator plate.

A plate-like evaporator, such as, for example, what is referred to as a coldwall evaporator produced by the roll-bonding method, can be produced particularly simply when, in accordance with yet another feature of the invention, there is provided a, the heat exchanger is configured as an evaporator plate and is connected on one of its heat exchange surfaces to the flexurally slack wall of the reception container at least as far as possible heat-conductively and at least approximately in a liquid-tight manner.

In a heat exchanger configured as a coldwall evaporator, the reception container is manufactured from a material resistant and diffusion-tight to the thermal energy storage medium and having a temperature resistance of at least 170° Celsius. By virtue of the configuration of the flexurally slack wall in relation to the evaporator plate, particularly intensive heat-conducting contact between the reception container and the evaporator plate is produced because the flexurally slack wall fits snugly against different contours of the evaporator plate, such as, for example, the duct pattern of the latter. The possibility of the separate manufacture of the reception container, on one hand, and of the evaporator plate, on the other hand, makes it feasible to employ the conventional successfully proved manufacturing process for the latter.

The reception container, which is in heat-conducting contact with the evaporator plate, has a particularly beneficial effect on energy saving in refrigerators when, in accordance with yet an added feature of the invention, the reception container is adapted, at least on its flexurally slack wall that is in heat-conducting contact with the evaporator plate, at least as far as possible to the dimensions of the evaporator plate.

In accordance with yet a further feature of the invention, there is provided a wire-tube evaporator system having a meandering refrigerant line and wire-bar planes spanning the refrigerant line, the evaporator system including the reception container disposed between the wire-bar planes.

In accordance with yet an additional feature of the invention, there is provided a substantially pierce-resistant protective casing, the reception container being disposed between the wire-bar planes and being surrounded by the casing.

The reception container filled with the thermal energy storage medium can be brought into heat-conducting contact in a particularly simple and extremely efficient way with a heat exchanger configured as a wire-tube evaporator when, according to an alternative embodiment of the subject of the invention, the heat exchanger is configured as a wire-tube evaporator and, between its wire-bar planes spanning a meander-like refrigerant line, is equipped with at least one reception container.

By the reception container being produced from material that is flexurally slack on all sides, the reception container can be inserted quickly and easily between the wire-bar planes even when it is in the state filled with eutectic solution, particularly intensive heat-conducting contact both with the wire-bar planes and with the meander-like refrigerant line being achieved by the flexurally slack walls of the reception container.

In accordance with again another feature of the invention, the reception container disposed, in the case of a wire-tube evaporator, between the wire-bar planes of the latter is surrounded by an at least pierce-resistant protective casing. The configuration ensures, in a simple way, that the reception container formed from flexurally slack material is not inadvertently damaged.

The reception container can be produced from flexurally slack material particularly simply and cost-effectively when, in accordance with again a further feature of the invention, the reception container is configured at least approximately in the manner of a bag. By virtue of such a configuration, the reception container, after being filled with a thermal energy storage medium, can be closed in a liquid-tight manner cost-effectively by conventional closing techniques, such as, for example, welding or the like.

In accordance with again an added feature of the invention, the bag is subdivided in terms of its reception space into at least two partial volumes subdividing its receiving volume and independent of one another.

By the receiving volume of the baglike reception container being subdivided into, for example, a plurality of partial volumes completely separate from one another, it becomes markedly easier to handle the reception container in the manufacturing sequence of the heat exchangers and of the refrigerators equipped with them because of the relatively small quantity of thermal energy storage medium associated with a partial volume. Should the baglike reception container having a plurality of partial volumes subdividing its receiving volume be used in a vertically disposed refrigerator evaporator plate, the partial volumes ensure that, despite the reception container being disposed vertically, the thermal energy storage medium is distributed substantially uniformly over the evaporator surface that is in heat-conducting contact with the reception container. In addition, the division of the receiving volume of the reception container into a plurality of partial reception spaces in the case of what are referred to as coldwall evaporators prevents the foaming heat insulation material from forcing together the liquid thermal energy storage medium in a direction predetermined by the foam filling of the heat-insulating housing of a refrigerator and, consequently, the large-area contact of the thermal energy storage medium with the evaporator plate from being canceled.

In accordance with again an additional feature of the invention, the reception container is formed from a metallic material with a film-like material zone. By the reception container being produced from film-like metals, such as, for example, aluminum, high-grade steel, or the like, a relatively pierce-resistant reception container for the liquid eutectic is provided, without an additional protective casing. When an aluminum film is used, not only is a particularly beneficial transmission of heat to the heat exchanger achieved, but, in the case of plastic coating, by which the film side surrounding the receiving volume of the reception spaces is given a plastic layer, the reception container formed from an aluminum film can be cost-effectively closed in a liquid-tight manner, for example by welding.

A liquid-tight reception container with partial reception spaces subdividing its receiving volume can be produced particularly cost-effectively when, n accordance with still a further feature of the invention, there is provision for the reception container to be formed from a plastic film.

A reception container is configured particularly advantageously with regard to heat transmission, on one hand, and to a liquid-tight closure of the partial reception spaces receiving the partial volumes, on the other hand, when, in accordance with still an added feature of the invention, the reception container is formed from a plastic-coated aluminum film.

In accordance with a concomitant feature of the invention, the reception container, in terms of its receiving volume formed by the reception space or in terms of each partial receiving volume of a reception space, corresponds at least to the volume of the thermal energy storage medium in the solid state of aggregation. Such a configuration ensures that the increase in volume of the thermal energy storage medium changing from the liquid to the solid state of aggregation does not lead to the reception container being destroyed.

Other features that are considered as characteristic for the invention are set forth in the appended claims.

Although the invention is illustrated and described herein as embodied in a heat exchanger, such as evaporator, condenser, or the like, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
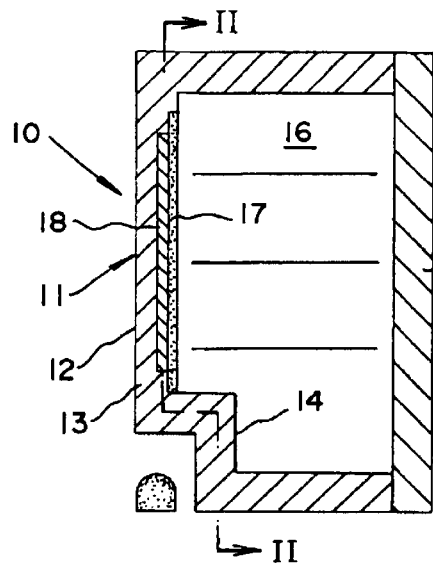
FIG. 1 is a cross-sectional diagrammatic view of a household refrigerator with a first application variant of a reception container according to the invention filled with a thermal energy storage medium and disposed in heat-conducting contact with a coldwall evaporator.

Referring now to the figures of the drawings in detail and first, particularly to FIG. 1 thereof, there is shown a household chill cabinet or refrigerator 10 with a heat-insulating housing 11 is shown in a simplified diagrammatic illustration. The housing 11 possesses an outer cladding 12, a heat insulation layer 13 produced by foaming, and an inner cladding 14 that is produced by the non-cutting shaping of a plastic plate and that is connected to the outer cladding 12 by the adhesively acting heat-insulation foam 13 to form a dimensionally rigid structure. The inner cladding 14 serves for lining a refrigerated space 16 that is capable of being closed by a door 15 and that is cooled by an evaporator 17, what is referred to as a coldwall evaporator, attached in heat-conducting contact to the rear wall of the inner cladding 14 on the heat insulation side. The evaporator 17 is produced, for example, by what is referred to as the roll-bonding method and with its heat exchange surface, smooth by virtue of the type of production, is connected heat-conductively to the inner cladding 14, while the heat exchange surface, provided with the duct pattern, of the evaporator 17 faces the heat insulation 13. The heat exchange surface of the evaporator 17 located on the heat insulation side is in heat-conducting contact with a separate reception container 18 for receiving a thermal energy storage medium.

Figure 2:
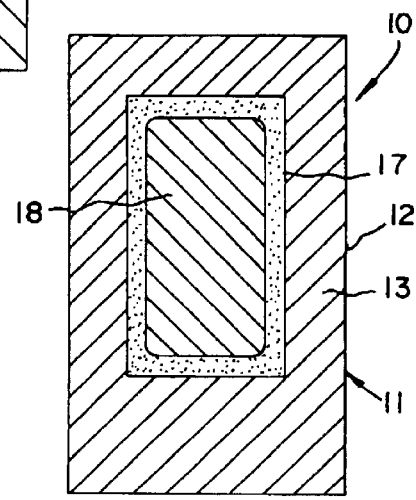
FIG. 2 is a cross-sectional view of the refrigerator of FIG. 1 along section line II—II.
Figure 3:
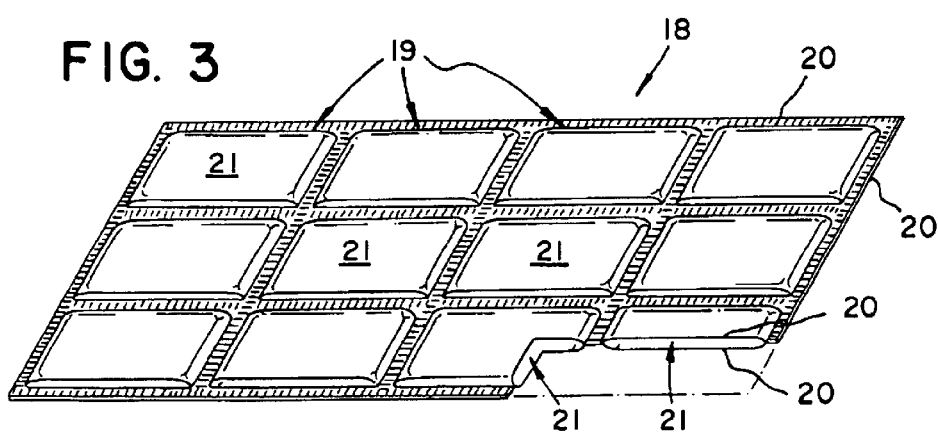
FIG. 3 is a fragmentary, perspective view of a reception container according to the invention for the refrigerator of FIG. 1.

In the present case, the reception container 18 is produced in the form of a bag from flexurally slack thin-walled material for the purpose of optimum adaption of the bag outside that is in heat-conducting contact with the evaporator 17. The reception container 18, configured in the form of a bag and is produced, for example, from a plastic-coated aluminum film secured, at least at its periphery edge, to the evaporator plate 17 in a liquid-tight manner relative to the foaming heat insulation material 13. As shown particularly in FIG. 3, the reception container 18 possesses a reception space 19 that is defined by the length, width and height of the bag 18 and that, in the present case, is subdivided into a plurality of partial reception spaces 21 produced so as to be liquid-tight from one another by the welding of its bag walls 20 located opposite one another. Each of these partial reception spaces 21 is filled with a thermal energy storage medium (eutectic) with, for example, 80% of water and 20% of ethanol, each of the partial reception spaces 21 being made larger, in terms of its receiving volume, than the volume capable of being achieved by the thermal energy storage medium in the solid state to prevent the partial reception spaces 21 from being destroyed during the freezing of the eutectic. In addition to the aluminum film coated, for example, with polyethylene, plastic films of polyethylene or polyamide, for example, are also suitable for producing the reception container 18 configured in the form of a bag, and the film-like materials must be selected so as to be both diffusion-tight and resistant with respect to the thermal energy storage media. To achieve as efficient a transmission of heat as possible from the evaporator 17 to the reception container 18 filled in its partial reception spaces 21 with a thermal energy storage medium. The reception container 18 is coordinated in terms of its dimensions at least substantially with the dimensions of the evaporator 17, as shown particularly in FIG. 2. The reception container 18 could also be manufactured from flexurally rigid material, with the exception of the side that is in heat-conducting contact with the evaporator 17, the side facing the evaporator 17 being formed from flexurally slack material.

Figure 4:
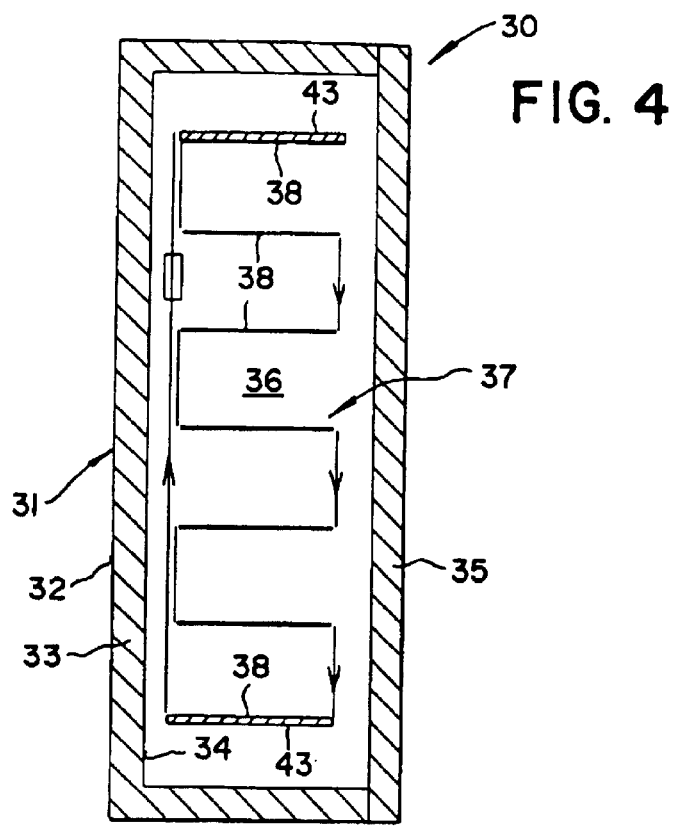
FIG. 4 is a cross-sectional diagrammatic view of a household freezer with a second application variant of the reception container according to the invention, disposed at the uppermost and lowermost evaporator tiers of a wire-tube evaporator.

FIG. 4 shows a second application variant of a separate reception container, explained in more detail further below, formed from flexurally slack material and intended for receiving a thermal energy storage medium, for application in a household freezer cabinet 30. Like the household chill cabinet 10, the freezer cabinet 30 possesses a heat-insulating housing 31 with an outer cladding 32, a heat insulation layer 33 produced by foaming, and a plastic inner cladding 34. The cladding 34 lines a freezer space 36 that is accessible through a door 35 and in which a wire-tube evaporator system 37 with a plurality of evaporator tiers 38 disposed parallel one above the other are disposed to maintain its intended temperature.

Figure 5:
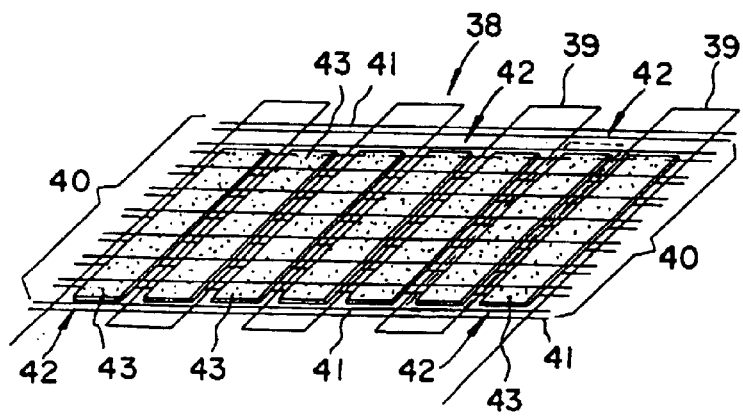
FIG. 5 is a fragmentary, perspective view of one of the evaporator tiers of FIG. 4.
Figure 6:
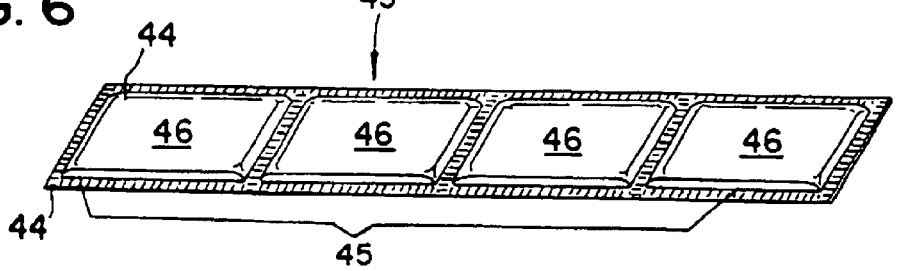
FIG. 6 is a fragmentary, perspective view of the reception container according to the invention for the freezer of FIG. 4.

As shown particularly in FIG. 5, these evaporator tiers 38 have a refrigerant line 39 that has a meandering shape and is configured as a pipeline and that is spanned, perpendicularly to its longer meander portions, by wire bars 41 located opposite one another that are disposed parallel to one another and generate wire-bar planes 40. The wire-bar planes 40, on one hand, and the meandering run of the refrigerant line 39, on the other hand, form interspaces 42, into which reception containers 43 for receiving a thermal energy storage medium can be introduced. The reception containers 43, which are advantageously associated with the uppermost and lowermost evaporator tiers 38, are configured substantially identically to the reception container 18 and are coordinated merely in terms of their dimensions with the dimensions of the interspaces 42. Like the reception container 18, the reception containers 43 are configured in the manner of a bag, the bag walls 44 of which are formed from flexurally slack material, such as, for example, thin-walled film-like aluminum, and are configured to be both resistant and diffusion-tight with respect to the thermal energy storage medium. The bag walls 44 surround a reception space 45 that is defined by the length, width, and height of the bag and is subdivided into partial reception spaces 46, each of which is separated hermetically from the other partial reception space 46 and serves for receiving a specific quantity of a thermal energy storage medium, the receiving volume of each partial reception space 46 corresponding at least to the volume that the thermal energy storage medium reaches in its solid state of aggregation. The reception containers 43, which can be produced separately, independently of the wire-tube evaporator system 37, are also suitable, in particular, for equipping conventional wire-tube evaporator systems 37, with the result that a marked energy saving, to be precise in the range of between 5% and 15%, is achieved for refrigerators in a cost-effective way, without at the same time having to develop and manufacture a novel wire-tube evaporator system deviating completely from the conventional wire-tube evaporator systems 37.

Where appropriate, to protect the reception containers 43 against unintentional destruction, there may be provision for the containers 43 to be surrounded by a pierce-resistant protective casing (diagrammatically illustrated by the dashed lines in FIG. 5). Should the reception containers 43 be formed, for example, from a plastic-coated aluminum film, polyethylene and polyamide plastic films also being suitable, some degree of pierce resistance is already achieved, so that an additional protective casing may be dispensed with. The reception containers manufactured from flexurally slack material possess the property of coming to bear particularly efficiently in heat-conducting contact with the wire-bar planes 40, on one hand, but also with the refrigerant line 39, on the other hand, to achieve efficient heat exchange.

We claim:

1. A heat exchanger for a refrigerator, comprising:
a chill cabinet including at least one separate reception container receiving a thermal energy storage medium and having at least one flexurally slack container wall bearing at least approximately in heat-conducting contact against the thermal energy storage medium dependent upon the flexurally slack properties of said container wall.

2. The heat exchanger according to claim 1, wherein said reception container is formed substantially from a flexurally slack material.

3. The heat exchanger according to claim 1, including an evaporator plate having heat exchange surfaces, one of said heat exchange surfaces being substantially disposed in heat-conducting contact with said flexurally slack container wall of said reception container and being approximately liquid-tightly coupled to said one heat exchange surface.

4. The heat exchanger according to claim 3, wherein:
said evaporator plate has dimensions; and
said reception container has a size adapted substantially to said dimensions at least on said flexurally slack container wall in heat-conducting contact with said evaporator plate.

5. The heat exchanger according to claim 1, including a wire-tube evaporator system having a meandering refrigerant line and wire-bar planes spanning said refrigerant line, said evaporator system including said reception container disposed between said wire-bar planes.

6. The heat exchanger according to claim 5, including a substantially pierce-resistant protective casing, said reception container being disposed between said wire-bar planes and being surrounded by said casing.

7. The heat exchanger according to claim 1, wherein said reception container is bag-shaped.

8. The heat exchanger according to claim 1, wherein said reception container is a bag.

9. The heat exchanger according to claim 8, wherein:
said bag defines a reception space with a receiving volume; and
said reception space is subdivided into at least two partial reception spaces independent of one another.

10. The heat exchanger according to claim 1, wherein said reception container is of a metallic material having a film shape with a given film thickness.

11. The heat exchanger according to claim 1, wherein said reception container is of a plastic film.

12. The heat exchanger according to claim 1, wherein said reception container is formed from a plastic-coated aluminum film.

13. The heat exchanger according to claim 1, wherein said reception container is of a plastic-coated aluminum film.

14. The heat exchanger according to claim 1, wherein said reception container defines a reception space with a receiving volume corresponding at least to a volume of the thermal energy storage medium when in a solid state of aggregation.

15. The heat exchanger according to claim 1, wherein:
said reception container defines a reception space; and
said reception space is subdivided into at least two partial reception spaces each with a receiving volume corresponding at least to a volume of the thermal energy storage medium in a solid state of aggregation.

16. A heat exchanger for a refrigerator, comprising:
a freezer cabinet including at least one separate reception container receiving a thermal energy storage medium and having at least one flexurally slack container wall bearing at least approximately in heat-conducting contact against the thermal energy storage medium dependent upon the flexurally slack properties of said container wall.

17. A heat exchanger for a refrigerator, comprising:
at least one separate reception container receiving a thermal energy storage medium and having at least one flexurally slack container wall bearing at least approximately in heat-conducting contact against the thermal energy storage medium dependent upon the flexurally slack properties of said container wall; and
a wire-tube evaporator system having a meandering refrigerant line and wire-bar planes spanning said refrigerant line, said evaporator system including said reception container disposed between said wire-bar planes.

18. The heat exchanger according to claim 17, including a substantially pierce-resistant protective casing, said reception container being disposed between said wire-bar planes and being surrounded by said casing.

19. A heat exchanger for a refrigerator, comprising:

at least one separate reception container being of a metallic material having a film shape with a given film thickness, receiving a thermal energy storage medium and having at least one flexurally slack container wall bearing at least approximately in heat-conducting contact against the thermal energy storage medium dependent upon the flexurally slack properties of said container wall.

20. A heat exchanger for a refrigerator, comprising:

at least one separate reception container being formed from a plastic-coated aluminum film, receiving a thermal energy storage medium and having at least one flexurally slack container wail bearing at least approximately in heat-conducting contact against the thermal energy storage medium dependent upon the flexurally slack properties of said container wall.

21. A heat exchanger for a refrigerator, comprising:

at least one separate reception container being formed from a plastic-coated aluminum film receiving a thermal energy storage medium and having at least one flexurally slack container wall bearing at least approximately in heat-conducting contact against the thermal energy storage medium dependent upon the flexurally slack properties of said container wall.

22. A heat exchanger for a refrigerator, comprising:

at least one separate reception container receiving a thermal energy storage medium and having at least one flexurally slack container wall bearing at least approximately in heat-conducting contact against the thermal energy storage medium dependent upon the flexurally slack properties of said container wall, said reception container defines a reception space with a receiving volume corresponding at least to a volume of the thermal energy storage medium when in a solid state of aggregation.

23. A heat exchanger for a refrigerator, comprising:

at least one separate reception container receiving a thermal energy storage medium and having at least one flexurally slack container wall bearing at least approximately in heat-conducting contact against the thermal energy storage medium dependent upon the flexurally slack properties of said container wall, said reception container defines a reception space; and said reception space is subdivided into at least two partial reception spaces each with a receiving volume corresponding at least to a volume of the thermal energy storage medium in a solid state of aggregation.

* * * * *